United States Patent
Papa et al.

(10) Patent No.: US 12,489,741 B2
(45) Date of Patent: Dec. 2, 2025

(54) ENTERPRISE MULTI-TECHNOLOGY CORE AND SUBSCRIBER MANAGEMENT

(71) Applicant: Parallel Wireless, Inc., Nashua, NH (US)

(72) Inventors: Steven Paul Papa, Windham, NH (US); Rajesh Kumar Mishra, Westford, MA (US); Kaitki Agarwal, Westford, MA (US); Keith Johnson, Wellesley, MA (US)

(73) Assignee: Parallel Wireless, Inc., Nashua, NH (US)

( * ) Notice: Subject to any disclaimer, the term of this patent is extended or adjusted under 35 U.S.C. 154(b) by 674 days.

(21) Appl. No.: 17/499,021

(22) Filed: Oct. 12, 2021

(65) Prior Publication Data

US 2022/0116383 A1  Apr. 14, 2022

Related U.S. Application Data

(60) Provisional application No. 63/089,814, filed on Oct. 9, 2020.

(51) Int. Cl.
*H04L 9/40* (2022.01)
*H04W 12/06* (2021.01)
*H04W 12/71* (2021.01)

(52) U.S. Cl.
CPC ........ *H04L 63/0815* (2013.01); *H04L 63/105* (2013.01); *H04W 12/06* (2013.01); *H04W 12/71* (2021.01)

(58) Field of Classification Search
CPC .. H04L 63/0815; H04L 63/105; H04W 12/06; H04W 12/71
See application file for complete search history.

(56) References Cited

U.S. PATENT DOCUMENTS

| | | | | |
|---|---|---|---|---|
| 2008/0201731 | A1* | 8/2008 | Howcroft | H04N 21/466 |
| | | | | 348/E7.071 |
| 2013/0269017 | A1* | 10/2013 | Patil | G06F 21/41 |
| | | | | 726/8 |
| 2014/0086177 | A1* | 3/2014 | Adjakple | H04W 74/04 |
| | | | | 370/329 |
| 2018/0060857 | A1* | 3/2018 | Wilkinson | H04N 21/42203 |
| 2020/0313983 | A1* | 10/2020 | Stammers | H04L 41/40 |
| 2022/0022035 | A1* | 1/2022 | Sampson | H04W 4/80 |
| 2022/0086692 | A1* | 3/2022 | Nelson | H04W 4/90 |

OTHER PUBLICATIONS

"Charging Data Record", https://en.wikipedia.org/wiki/Charging_data_record, downloaded Aug. 28, 2024.
"5G iMEC Networking Platform", https://www.gigabyte.com/FileUpload/Global/Multimedia/33/file/537/971.pdf, May 2019 V1.0, downloaded Aug. 28, 2024.

* cited by examiner

*Primary Examiner* — Elton Williams
(74) *Attorney, Agent, or Firm* — Michael Y. Saji

(57) ABSTRACT

A method, system, and computer readable medium are disclosed for providing enterprise multi-technology core and subscriber management. In one embodiment a method includes providing an enterprise network including: at least one Open connect Provider (OP); at least one Access Point (AP) in communication with at least one OP; a locally placed edge core in communication with at least one AP; and using a single sign on service for the edge core to allow different services to be used by different users.

20 Claims, 5 Drawing Sheets

ENTERPRISE MULTI-TECHNOLOGY CORE AND SUBSCRIBER MANAGEMENT

CROSS-REFERENCE TO RELATED APPLICATIONS

This application claims priority under 35 U.S.C. § 119(e) to U.S. Provisional Pat. App. No. 63/089,814, filed Oct. 9, 2020, titled "Enterprise Multi-Technology Core and Subscriber Management" which is hereby incorporated by reference in its entirety for all purposes. The present application also hereby incorporates by reference each of U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "Max-Mesh: Mesh Backhaul Routing," filed Apr. 18, 2016, each in its entirety for all purposes, respectively. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

Cellular networks are high-speed, high-capacity voice and data communication wireless networks with enhanced multimedia and seamless roaming capabilities for supporting cellular devices. With the increase in popularity of cellular devices, these networks are used for more than just entertainment and phone calls. They have become the primary means of communication for finance-sensitive business transactions, lifesaving emergencies, and life-/mission-critical services such as E-911. Today these wireless networks have become the lifeline of communications. A wireless network system typically does not include a local core network. The wireless system instead typically uses a backhaul connection to connect to a core network.

SUMMARY

In one embodiment a wireless network system includes an enterprise network including: at least one Open connect Provider (OP); at least one Access Point (AP) in communication with at least one OP; a locally placed edge core in communication with at least one AP; and wherein a single sign on service is used for the edge core to allow different services to be used by different users.

In another embodiment, a method for providing enterprise multi-technology core and subscriber management includes providing an enterprise network including: at least one Open connect Provider (OP); at least one Access Point (AP) in communication with at least one OP; a locally placed edge core in communication with at least one AP; and using a single sign on service for the edge core to allow different services to be used by different users.

In another embodiment, a non-transitory computer-readable medium containing instructions for providing enterprise multi-technology core and subscriber management, when executed, cause a system to perform steps comprising: in a system including an enterprise network and having at least one Open connect Provider (OP), at least one Access Point (AP) in communication with at least one OP, and a locally placed edge core in communication with at least one AP; and using a single sign on service for the edge core to allow different services to be used by different users.

DETAILED DESCRIPTION

Figure 1:
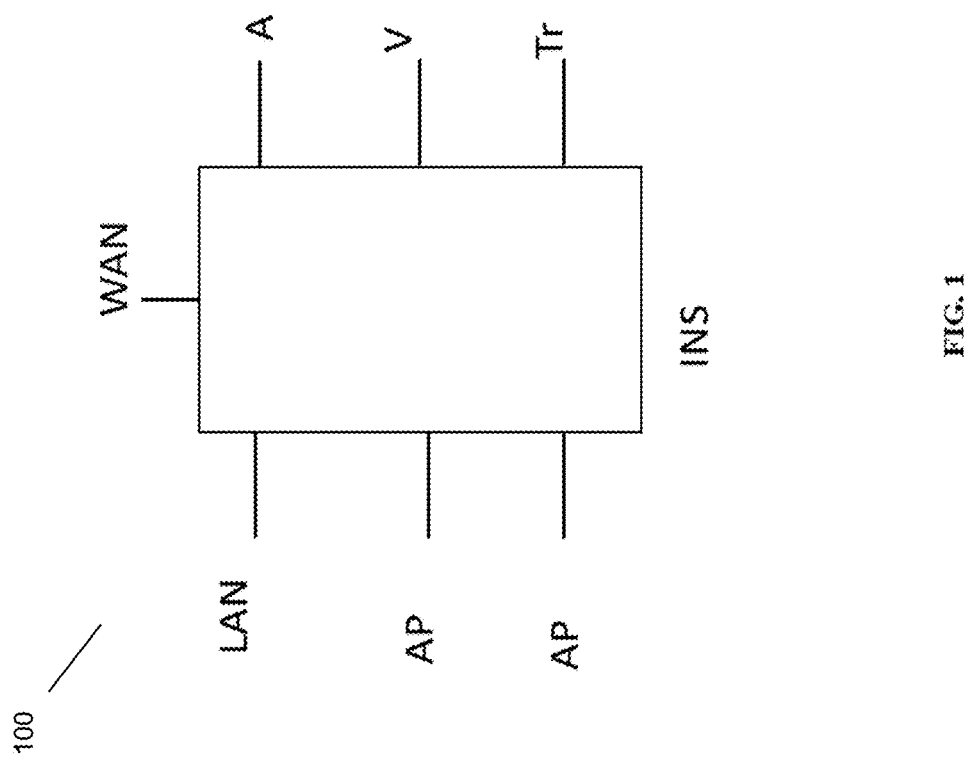
FIG. 1 is a diagram of an edge core, in accordance with some embodiments.

FIG. 1 shows a network having an Edge core 100 placed locally. Placing an Edge core locally aids in lowering latency; providing scalable user control (distributed), users can use smartphones and subvert corporate policies; local policies by virtue of being before WAN router; and can also add arbitrary number of operator-specific policies for as many different operators that are part of the solution—which policies applied based on the SIM in the user devices.

Can use shared spectrum like Citizens Broadband Radio Service (CBRS), enterprise 5G in Japan, femtos on an operators spectrum like in UK, or with permission from operator to set up femto for Multi-Operator Core Networks (MOCN) use; can also use WiFi for carrier WiFi.

Use single sign on service to "provision" an "include" list for edge core. This can be multiple lists for different levels of access/access to specific resources like any router/AP can be configured; also allows enterprise to monitor the use of the network from employee devices; can also provision Operator subscribers (ATT subscribers can get access to the femtos, get local egress for good experience) and visitors that are not operator's spectrum (MOCN use case).

Cloud Mobility Management Entity (MME)/Access and Mobility Management function (AMF) can have a single connection to an operator's HSS and have thousands of edge cores provisioning with it to minimize operator complexity Edge core can create Charging Data Records (CDRs) to inform many policies whether billing, appropriate use of resources, etc. So if I am serving ATT subscribers from my CBRS radios and if I have a deal to chargeback ATT, I can do that.

Same solution allows me to provide the 5G latency experience from a single hosted MME/AMF in the cloud for Internet Service Providers (ISPs) or neutral host providers.

Figure 2:
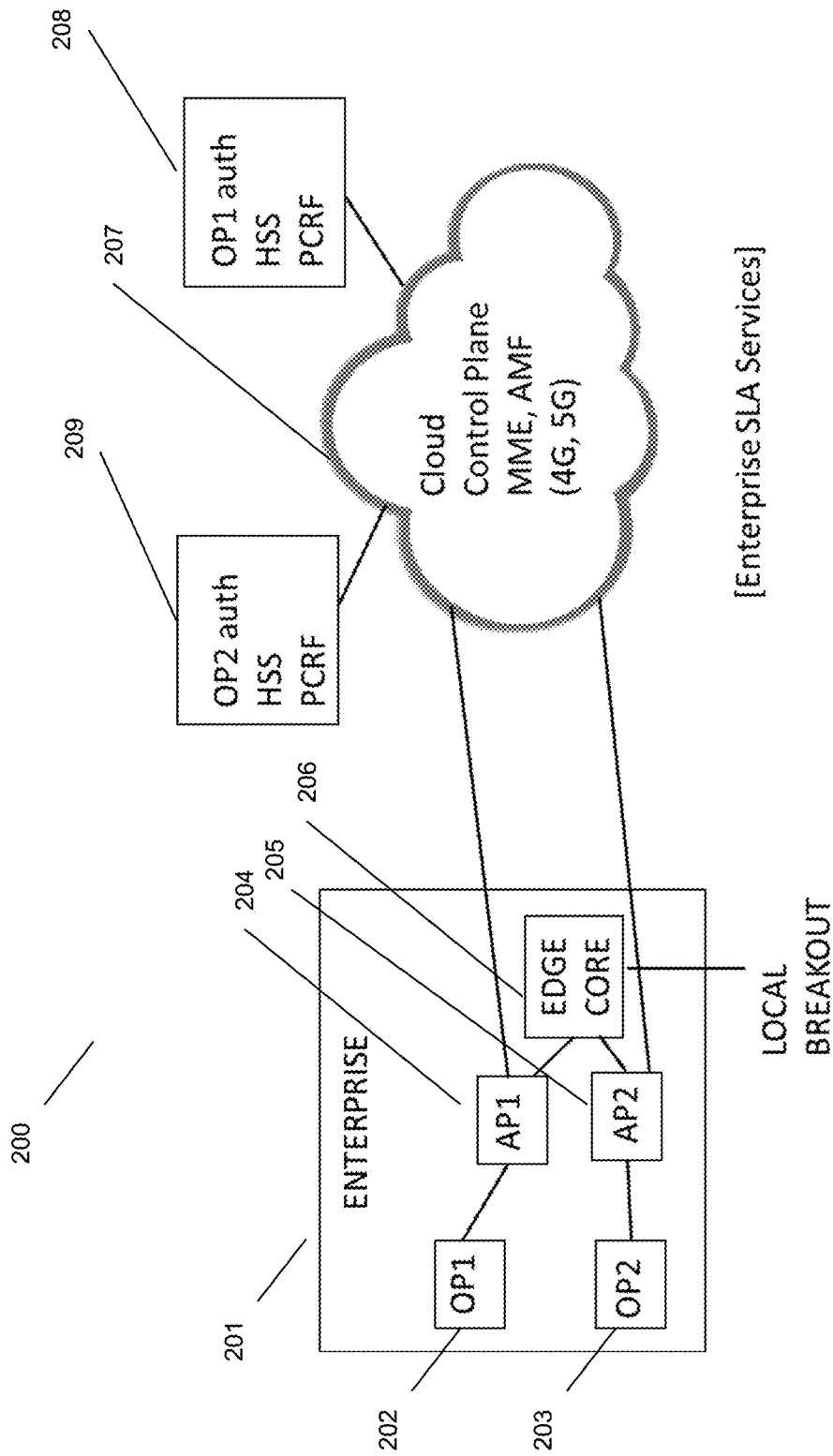
FIG. 2 is a diagram of a system for enterprise multi-technology core and subscriber management, in accordance with some embodiments.

FIG. 2 shows a system 200 including an enterprise network 200 with a local edge core. System 200 includes an enterprise network 201 which includes a first open connect provider (OP) 202 and a second OP 202. Also included is an Access Point (AP) 1 and AP2. Also shown is an edge core 206. The system 200 includes an OP@ authorization device 209 and an OP1 authorization device 208 as well as cloud 207.

At the edge core we can have a different Service Level Agreement (SLA) based on commercial agreement with the operator. We can also have enterprise services at the edge or operator preferred services again based on some commercial model.

We can cache subscriber auth in the cloud at MME, AMF so that operator does not get charged for multiple authorizations going to Home Subscriber Service (HSS). Today they get charged for each auth by HSS vendor.

We can provide edge analytics based on International Mobile Equipment Identity (IMEI) (or another identifier for privacy preservation) and share the data with operator.

Another key part of edge core and unified data plane—the handoff between a 4G-4G site is very smooth, for the 5G UX we need handoff between 5G and WiFi, 5G and 5G, 5G and 4G all to be as smooth (and free from dropped packets) as 4G-4G.

We can view this model i.e. enterprise network as visited network. A roaming hosted network can be set up as an enterprise network. Each operator can have a roaming/enterprise agreement and work out commercial aspect for each operator on the same infra. That's where we can bring in network slicing as a combination technology.

In some embodiments we may add separate charging, SLA for local break out or just SLA for local breakout. At the giLAN it will have different control than the operator network. We may add enterprise specific services, controls there i.e. block certain traffic etc.

In the US with CBRS and MS would want to allow you to easily provision access to an employee's carrier phone, e.g., Verizon/ATT/TMO/Sprint phone so that you can have 5 g experience on enterprise LAN. Edge core needs to be where this happens as the SIM is controlled by TT/TMO/VZ/Sprint and Google/MS/AMZ would be responsible for getting the big 4 operators to buy in that when you use their cloud services (Office365/Googleapps) that IT can easily provision the use of the enterprise CBRS network for your local resources using same phone you use when you leave the office.

Figure 3:
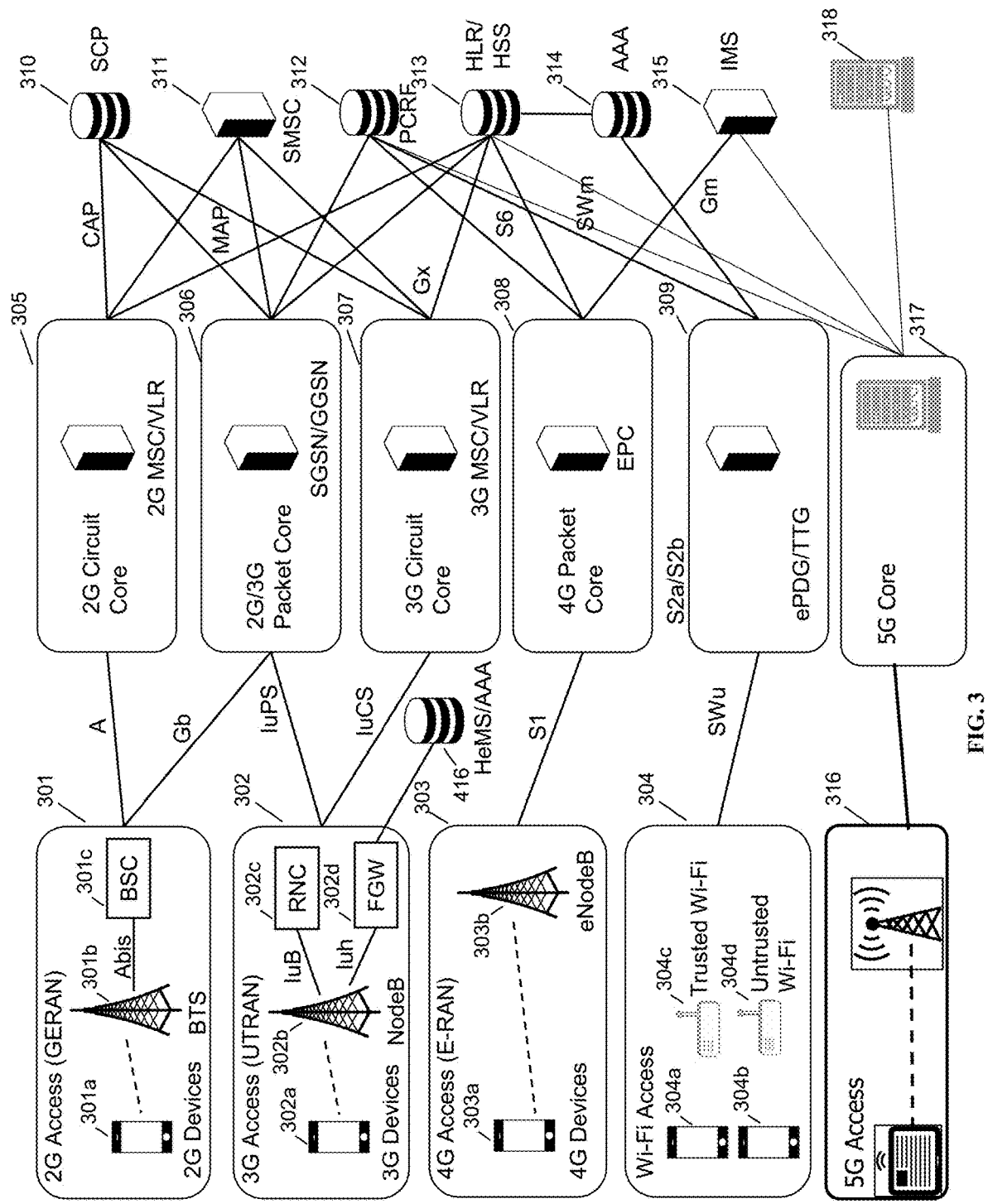
FIG. 3 is a network architecture diagram, in accordance with some embodiments.

In UK, some providers may want to use their own core for enterprise, in some embodiments, but let company have local breakout/their own nodes (this is because the carrier may enable your enterprise solution than you just sit on their spectrum indoors as the new spectrum rules allow). What that means is an enterprise needs to control what SIMS are eligible for local breakout but nothing else—the rest is handled by main core. Google/Amazon/Microsoft will want to enable something similar—where they can tie authentication back to local breakout for an individual's existing SIM. They also want to host a cloud EPC for enterprises in the hopes of creating multiple network enterprises (like Google fi). The net of this is that the strategic integration of authentication—may be in some embodiments the Edge core "include" list for local breakout/access to enterprise resources more than an Enterprise EPC FIG. 3 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 301a, BTS 301b, and BSC 301c. 3G is represented by UTRAN 302, which includes a 3G UE 302a, nodeB 302b, RNC 302c, and femto gateway (FGW, which in 3GPP namespace is also known as a Home nodeB Gateway or HNBGW) 302d. 4G is represented by EUTRAN or E-RAN 303, which includes an LTE UE 303a and LTE eNodeB 303b. Wi-Fi is represented by Wi-Fi access network 304, which includes a trusted Wi-Fi access point 304c and an untrusted Wi-Fi access point 304d. The Wi-Fi devices 304a and 304b may access either AP 304c or 304d. In the current network architecture, each "G" has a core network. 2G circuit core network 305 includes a 2G MSC/VLR; 2G/3G packet core network 306 includes an SGSN/GGSN (for EDGE or UMTS packet traffic); 3G circuit core 307 includes a 3G MSC/VLR; 4G circuit core 308 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 330, the SMSC 331, PCRF 332, HLR/HSS 333, Authentication, Authorization, and Accounting server (AAA) 334, and IP Multimedia Subsystem (IMS) 335. An HeMS/AAA 336 is present in some cases for use by the 3G UTRAN. The diagram is used to indicate schematically the basic functions of each network as known to one of skill in the art, and is not intended to be exhaustive. For example, 5G core 317 is shown using a single interface to 5G access 316, although in some cases 5G access can be supported using dual connectivity or via a non-standalone deployment architecture. Each of these core network functionalities are understood to be able to be implemented as an edge core according to the present application.

Noteworthy is that the RANs 301, 302, 303, 304 and 336 rely on specialized core networks 305, 306, 307, 308, 309, 337 but share essential management databases 330, 331, 332, 333, 334, 335, 338. More specifically, for the 2G GERAN, a BSC 301c is required for Abis compatibility with BTS 301b, while for the 3G UTRAN, an RNC 302c is required for Iub compatibility and an FGW 302d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 4:
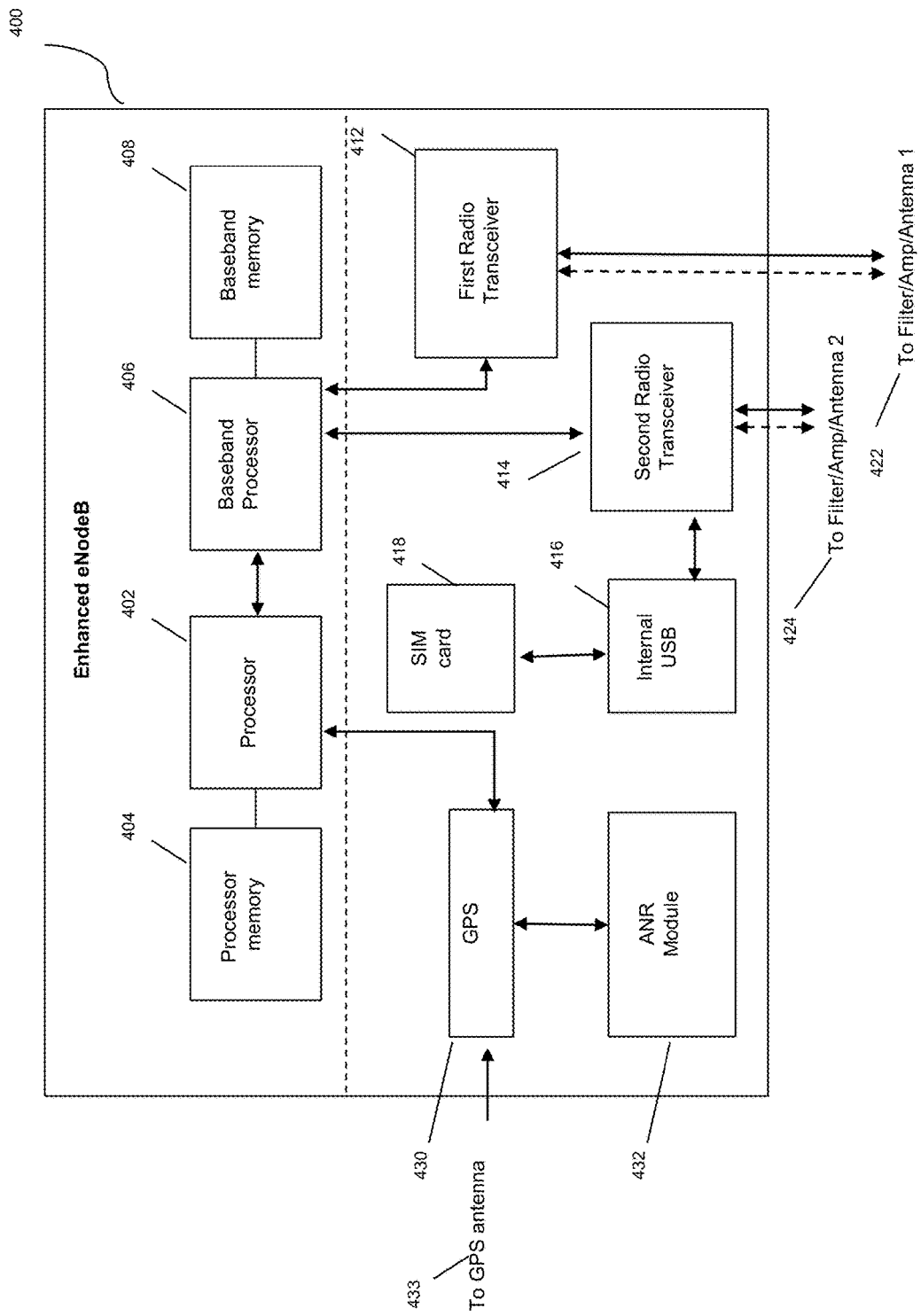
FIG. 4 is an enhanced eNodeB for performing the methods described herein, in accordance with some embodiments.

FIG. 4 is a block diagram of an enhanced eNodeB for performing the methods described herein, in accordance with some embodiments. eNodeB 400 may include processor 402, processor memory 404 in communication with the processor, baseband processor 406, and baseband processor memory 408 in communication with the baseband processor. Mesh network node 400 may also include first radio transceiver 412 and second radio transceiver 414, internal universal serial bus (USB) port 416, and subscriber identification module card (SIM card) 418 coupled to USB port 416. In some embodiments, the second radio transceiver 414 itself may be coupled to USB port 416, and communications from the baseband processor may be passed through USB port 416. The second radio transceiver may be used for wirelessly backhauling eNodeB 400.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 412 and 414. Baseband processor 406 may use memory 408 to perform these tasks.

The first radio transceiver 412 may be a radio transceiver capable of providing LTE eNodeB functionality, and may be capable of higher power and multi-channel OFDMA. The second radio transceiver 414 may be a radio transceiver capable of providing LTE UE functionality. Both transceivers 412 and 414 may be capable of receiving and transmitting on one or more LTE bands. In some embodiments, either or both of transceivers 412 and 414 may be capable of providing both LTE eNodeB and LTE UE functionality. Transceiver 412 may be coupled to processor 402 via a Peripheral Component Interconnect-Express (PCI-E) bus, and/or via a daughtercard. As transceiver 414 is for providing LTE UE functionality, in effect emulating a user equipment, it may be connected via the same or different PCI-E bus, or by a USB bus, and may also be coupled to SIM card 418. First transceiver 412 may be coupled to first radio frequency (RF) chain (filter, amplifier, antenna) 422, and second transceiver 414 may be coupled to second RF chain (filter, amplifier, antenna) 424.

SIM card 418 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 412 and 414, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 402 for reconfiguration.

A GPS module 430 may also be included, and may be in communication with a GPS antenna 432 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 432 may also be present and may run on processor 402 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 5:
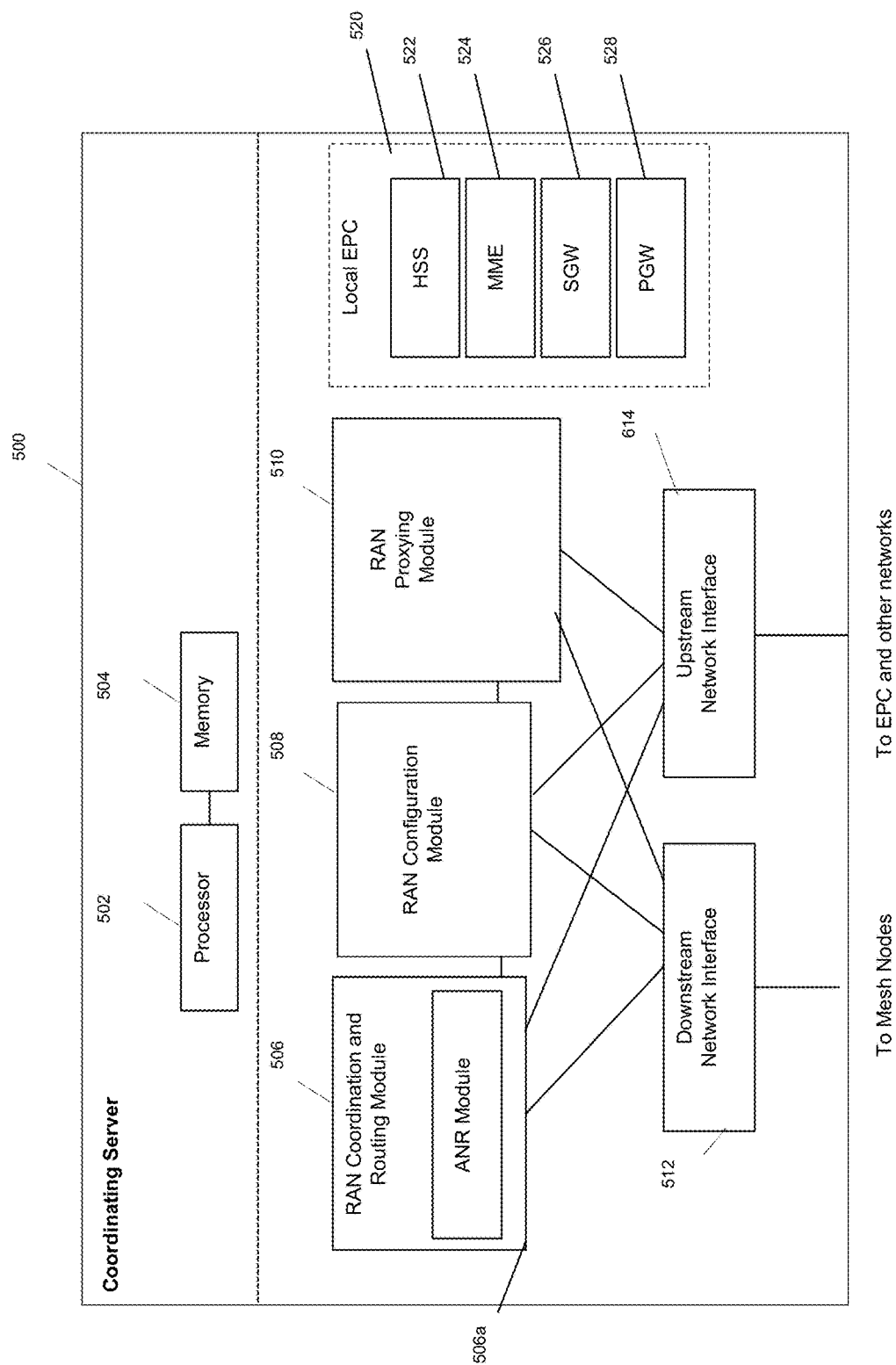
FIG. 5 is a coordinating server for providing services and performing methods as described herein, in accordance with some embodiments.

FIG. 5 is a block diagram of a coordinating server for providing services and performing methods as described herein, in accordance with some embodiments. Coordinating server 500 includes processor 502 and memory 504, which are configured to provide the functions described herein. Also present are radio access network coordination/routing (RAN Coordination and routing) module 506, including ANR module 506a, RAN configuration module 508, and RAN proxying module 510. The ANR module 506a may perform the ANR tracking, PCI disambiguation, ECGI requesting, and GPS coalescing and tracking as described herein, in coordination with RAN coordination module 506 (e.g., for requesting ECGIs, etc.). In some embodiments, coordinating server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A wireless network system, comprising:
an edge core coupled and placed locally to an enterprise network; and
at least one Access Point (AP) in communication with the edge core;
wherein the edge core is configured to use a single sign on service to authenticate different services to be used by different users; and
wherein the locally placed edge core is further configured to create Charging Data Records (CDRs) for the different users, the CDRs reflecting charges to be billed for usage of the different services by the different users while on the enterprise network.

2. The system of claim 1 wherein the single sign on service provisions the edge core with multiple lists for different levels of access to specific resources or local breakout.

3. The system of claim 2 wherein the single sign on service allows an enterprise to monitor use of the enterprise network from employee devices.

4. The system of claim 1 wherein the single sign on service provisions access for at least one of operator subscribers or visitors that are not operator's spectrum.

5. The system of claim 1 wherein the single sign on service provisions access based on SIM card information.

6. The system of claim 1 wherein different Service Level Agreements (SLA) are at the edge core.

7. The system of claim 1 wherein edge analytics are provided based on international mobile equipment identity (IMEI).

8. A method for providing enterprise multi-technology core and subscriber management, comprising:
providing an edge core coupled and placed locally to an enterprise network including
at least one Access Point (AP) in communication with the edge core;
using a single sign on service by the edge core to authenticate different services to be used by different users; and
creating, at the locally placed edge core, Charging Data Records (CDRs) for the different users, the CDRs reflecting charges to be billed for usage of the different services by the different users while on the enterprise network.

9. The method of claim 8 wherein the using the single sign on service includes being provisioned with multiple lists for different levels of access to specific resources or local breakout.

10. The method of claim 9 wherein using the single sign on service includes allowing an enterprise to monitor use of the enterprise network from employee devices.

11. The method of claim 8 wherein the using the single sign on service includes being provisioned to allow access for at least one of operator subscribers or visitors that are not operator's spectrum.

12. The method of claim 8 wherein using the single sign on service includes being provisioned to allow access based on SIM card information.

13. The method of claim 8 further comprising using different Service Level Agreements (SLA) at the edge core.

14. The method of claim 8 further comprising providing edge analytics based on international mobile equipment identity (IMEI).

15. A non-transitory computer-readable media containing instructions for providing enterprise multi-technology core and subscriber management, which when executed, cause a system to perform steps comprising:
in a system including an edge core, coupled and placed locally to an enterprise network, and at least one Access Point (AP) in communication with the edge core;
using a single sign on service by the edge core to authenticate different services to be used by different users; and
creating, at the locally placed edge core, Charging Data Records (CDRs) for the different users, the CDRs reflecting charges to be billed for usage of the different services by the different users while on the enterprise network.

16. The computer-readable media of claim 15 wherein the instructions for using a single sign on service include instructions for being provisioned with multiple lists for different levels of access to specific resources or local breakout.

17. The computer-readable media of claim 16 further comprising instructions for allowing an enterprise to monitor use of the enterprise network from employee devices.

18. The computer-readable media of claim 15 wherein the instructions for using a single sign on service include instructions for being provisioned to allow access for at least one of operator subscribers or visitors that are not operator's spectrum.

19. The computer-readable media of claim 15 wherein instructions for a single sign on service include instructions for being provisioned to allow access based on SIM card information.

20. The computer-readable media of claim 15 further comprising instructions for using different Service Level Agreements (SLA) at the edge core, and instructions for providing edge analytics based on international mobile equipment identity (IMEI).

* * * * *